United States Patent Office 3,594,386
Patented July 20, 1971

3,594,386
8-SUBSTITUTED-1-OXA-3,8-DIAZASPIRO[4,5] DECAN-2-ONES
Gilbert Regnier, Sceaux, Roger Canevari, L'Hay-les-Roses, and Jean-Claude Le Douarec, Suresnes, France, assignors to Science Union et Cie, Société Francaise de Recherche Medicale, Suresnes, France
No Drawing. Filed Dec. 18, 1968, Ser. No. 784,871
Claims priority, application Great Britain, Dec. 29, 1967, 58,994/67
Int. Cl. C07d 29/30
U.S. Cl. 260—293.4          12 Claims

ABSTRACT OF THE DISCLOSURE 1-oxa-2-oxo-3,8-diazo spiro (4,5) decanes substituted in 8-position by (1) $\quad\quad\quad Ar-X-(CH_2)_n$ wherein X is —CO—, —CHOH—, —CH(OCH$_3$)—, $$-\underset{\underset{OH}{|}}{\overset{\overset{C_6H_5}{|}}{C}}-$$

$n$ is 1, 2 or 3, and
Ar is phenyl or mono- or di-halo-phenyl, or (2) $\quad\quad\quad Ar-(CH_2)_2-$ wherein Ar is 2-pyridyl or 4-pyridyl or certain substituted phenyl.

These compounds possess analgesic, antiinflammatory, central nervous system depressant and bronchodilator properties.

---

The present invention provides, as new compounds, derivatives of spiro (4,5) decane of the general formula $$R-N{\overset{7\quad 6}{\underset{9\quad 10}{\diagdown}}}C{\overset{5\quad 4}{\underset{O1\; 3NH}{\diagup}}}CH_2 \atop {\diagdown \overset{2}{C}\diagup} \atop \underset{O}{\|} \quad\quad (I)$$

in which R represents a group of the general formula $$Ar-X-(CH_2)_n- \quad\quad (II)$$

in which

X represents a carbonyl (—CO—), a seondary alcohol group (—CHOH—), a —CH(OCH$_3$)— or a $$-\underset{\underset{OH}{|}}{\overset{\overset{C_6H_5}{|}}{C}}-$$

group,
$n=1, 2$ or 3, and
Ar represents an unsubstituted phenyl radical or a phenyl radical substituted by one or two halogen atoms, such as Cl, Br or F, or in which R represents a group of the general formula $$Ar-(CH_2)_2- \quad\quad (III)$$

where Ar represents a 2-pyridyl or 4-pyridyl radical or a phenyl radical substituted by a nitro or amino, or by an acetamido (CH$_3$CONH—), propionamido (CH$_3$CH$_2$CONH—)

benzamido (C$_6$H$_5$—CO—NH—), parachlorobenzamido (Cl—C$_6$H$_4$—CO—NH—), orthohydroxybenzamido (HO—C$_6$H$_4$—CO—NH—)

methylsulfonamido —NH—SO$_2$—CH$_3$, sulfamido (—SO$_2$NH$_2$)

dimethylsulfamido [—SO$_2$—N—(CH$_3$)$_2$)], or a diethylsulfamido[—SO$_2$N—(C$_2$H$_5$)$_2$] group.
The new spiro (4,5) decane derivatives may be obtained by reacting 1 - oxa - 2 - oxo-3,8-diaza-spiro (4,5) decane of the formula $$HN{\diagdown}{\overset{C-CH_2}{\underset{\underset{\|}{C}}{\underset{O}{|}}{\diagup\underset{NH}{}}}} \quad\quad (IV)$$

with a halogen derivative of the general formula $$R-Z \quad\quad (V)$$

in which R has the above meaning and Z represents a chlorine or bromine atom.

According to a preferred form of the process a solution of 1 part of the selected halogen derivative (V) in a polar solvent is heated with a solution in the same solvent of 2 parts of spiro (4,5) decane (IV); the excess of spiro (4,5) decane (IV) serves as acceptor for the hydracid formed during the reaction.

The most suitable polar solvents for this reaction are lower aliphatic alcohols such, for example, as methanol, ethanol, isopropanol or butanol, or especially lower aliphatic ketones such, for example, as acetone, diethylketone or preferably methylethylketone which has the valuable property that it does not dissolve the starting halide of the spiro(4,5) decane formed during the reaction so that the starting material is easy to recover. It is also possible to use tertiary aliphatic amides such, for example, as dimethylformamide, but in this case the yield is definitely inferior.

In certain cases, when maximum yields are desired, it is advantageous to perform the condensation in the presence of a catalytic amount of an alkali metal iodide such, for example, as potassium or sodium iodide, in an amount of about 1% by weight of the spiro (4,5) decane used. The reaction temperature is preferably within the range of 60 to 100° C.

The new spiro (4,5) decane derivatives obtained in this manner are strong bases that can be converted into acid addition salts and are as such also included in the present invention. As acids suitable for the formation of acid addition salts there may be mentioned, from the mineral acid series, hydrochloric, hydrobromic, sulphuric and phosphoric acid; from the organic series, acetic, propionic, maleic, fumaric, succinic, benzoic tartaric, malic, oxalic and methane sulphonic acid.

If desired, the new derivatives may be purified by physical methods such, for example, as crystallization or chromatography, or by chemical methods such as formation of addition salts with mineral or organic acids, crystallizing these salts in a suitable solvent and decomposing them in an alkaline medium.

The new compounds of the present invention and their addition salts possess interesting pharmacological and therapeutic properties and may be used as medicaments, especially as analgesics, anti-inflammatory agents, depressants for central nervous system, and bronchodilators.

The toxicity studied in mice showed that the DL$_{50}$ varies from 150 to 900 mg./kg. per intraperitoneal route, and from 800 to >2000 mg./kg. per oral route.

The analgesic activity was observed in mice with the hot plate method of Woolf G. and MacDonald, A. D. [J. Pharmacol. 80, 300 (1944)]. An increase of the threshold of pain-perception was noted, going to 275% with doses of 50 mg./kg.

The anti-inflammatory property was demonstrated on the planta oedema of the rat's paw induced by injection of kaolin [Hillebrecht, J. Arzneimittelforschung 4, 607 (1954)].

It was noted that the compounds of the invention inhibit oedema up to 40% with 100 mg./kg. administered P.O. over a 3-day period.

It was also observed that some of the compounds of the present invention possess a central nervous system depressant property which is demonstrated by an important decrease of the mice spontaneous activity when put in an activograph, and by the "roller-test" of Dunham and Miya (J. Am. Pharm. Assoc. Ed. Sci. 46, 208 (1957): 100% of the animals treated with 20 mg./kg. I.P. fall down from the rolling-bars.

The new compounds inhibit the bronchospasm in the guinea-pig provoked by an I.V. injection of histamine, serotonine or acetylcholine, according to the method of Konzett and Rossler [Arch. Exptl. Pathol. U. Pharmak. 195, 71 (1940)] or when induced by an administration in form of aerosol of citric acid. Doses from 2.5 to 40 mg./kg. I.V. may inhibit 100% of these spasms.

The new compounds may be administered in human therapy especially in the treatment of pain, inflammation, nervous hyperexcitability and respiratory insufficiencies.

The doses may vary from 20 to 200 mg. administered 2 to 4 times per day per oral, rectal or parenteral route.

The active principle may be mixed or associated with the usual pharmaceutical carriers, such, for example, as distilled water, starch, talc, ethyl cellulose or cocoa butter. The pharmaceutical forms may be: tablets, dragees, capsules, suppositories or injectable or drinkable solutions.

The present invention accordingly also provides pharmaceutical preparations which comprise a compound of the general Formula I, or a physiologically tolerable salt thereof, in admixture or conjunction with a pharmaceutically acceptable carrier.

The following examples illustrate the invention. Unless otherwise indicated, the melting points have been determined on a Kofler heater.

EXAMPLE 1

1-oxa-2-oxo-3,8-diaza-8-phenacyl-spiro (4,5) decane

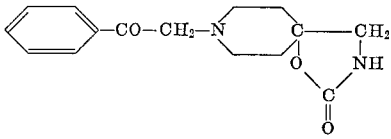

A solution of 12 grams of the known 1-oxa-2-oxo-3,8-diaza-spiro (4,5) decane (melting at 203° C.) and 6.5 grams of phenacyl chloride in 200 ml. of methyl ethylketone is heated in the presence of 0.1 gram of potassium iodide for 10 hours at reflux. On completion of the reaction the whole is cooled and the 1-oxa-2-oxo-3,8-diaza-spiro (4,5) decane hydrochloride formed is filtered off. The filtrate is concentrated to one quarter its original volume and then cooled, whereupon crystallization sets in to yield 5.7 grams of white crystals melting at 166° C.

By forming the hydrochloride in ethanol and recrystallizing the resulting salt from a mixture of equal parts of methanol and isopropanol, there are obtained 3 grams of 1-oxa-2-oxo-3,8-diaza-8-phenacyl-spiro (4,5) decane hydrochloride in the form of white crystals melting (capillary at 252 to 254° C. with decomposition.

The following compounds are obtained in a similar manner to that described above.

(a) 1 - oxa - 2 - oxo - 3,8 - diaza-8-(4'-chlorophenacyl-spiro (4,5) decane; melting point of the hydrochloride (on a micro-Kofler): 232 to 238° C., starting from 1-oxa-2-oxo-3,8-diaza-spiro (4,5) decane and 4-chlorophenacyl chloride.

(b) 1 - oxa - 2 - oxo - 3,8 - diaza-8-[3'-(4''-fluorobenzoyl)-propyl]-spiro (4,5) decane; melting point of the hydrochloride (on a micro-Kofler): 240 to 246° C., starting from 1-oxa-2-oxo-3,8-diaza-spiro (4,5) decane and 3-(4'-fluorobenzoyl)-propyl chloride.

(c) 1 - oxa - 2 - oxo - 3,8 - diaza-8-(2'-benzoylethyl)-spiro (4,5) decane, starting from 1-oxa-2-oxo-3,8-diaza-spiro (4,5) decane and 2-benzoylethyl chloride.

(d) 1 - oxa - 2 - oxo - 3,8 - diaza-8-[2'-(4''-chlorobenzoyl)-ethyl]-spiro (4,5) decane, starting from 1-oxa-2-oxo-3,8-diaza-spiro (4,5) decane and 2-(4'-chlorobenzoyl)-ethyl chloride.

(e) 1 - oxa - 2 - oxo - 3,8-diaza-8-(2'-chlorophenacyl)-spiro (4,5) decane, starting from 1-oxa-2-oxo-3,8-diaza-spiro (4,5) decane and 2-chlorophenacyl chloride.

(f) 1 - oxa - 2 - oxo - 3,8 - diaza-8-[3'-(3''-fluorobenzoyl)-propyl]-spiro (4,5) decane, starting from 1-oxa-2 - oxo - 3,8 - diaza - spiro (4,5) decane and 3-(3'-fluorobenzoyl)-propyl chloride.

EXAMPLE 2

1-oxa-2-oxo-3,8-diaza-8-[2'(4''-dimethylsulfamido-phenyl)-ethyl]-spiro (4,5) decane

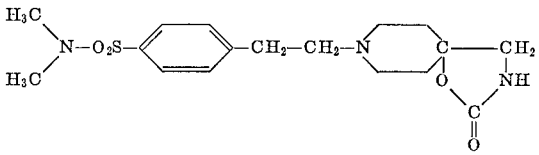

A solution of 12 grams of 1-oxa-2-oxo-3,8-diaza-spiro (4,5)-decane and 12.3 grams of 2-(4'-dimethylsulfamido-phenyl)-ethyl bromide [M.P. 99° C.] in 160 ml. of methylethylketone in the presence of 0.1 gram of potassium iodide is heated for 10 hours at reflux. On completion of the reaction the starting spiro (4,5) decane hydrobromide is filtered off and the solvent is evaporated out of the filtrate under vacuum. The crystalline residue is recrystallized from isopropaol, to yield finally 7.3 grams of 1 - oxa - 2 - oxo - 3,8-diaza-8-[2'-(4''-dimethylsulfamido-phenyl)-ethyl]-spiro (4,5) decane in the form of crystals which melt (capillary) at 177 to 179° C.

The corresponding hydrochloride melts at 266° C. (capillary).

The following compounds were prepared by the process described in this example:

(a) 1 - oxa - 2 - oxo - 3,8 - diaza-8-[2'-(4''-sulfamido-phenyl)-ethyl]-spiro (4,5) decane; melting point of the hydrochloride (capillary): 276 to 277° C., starting from 1-oxa-2-oxo-3,8-diaza-spiro (4,5) decane and 2-(4'-sulfamidophenyl)-ethyl bromide.

(b) 1 - oxa - 2 - oxo - 3,8 - diaza-8-[2'-(4''-nitrophenyl)-ethyl]-spiro (4,5) decane; melting point of the hydrochloride (capillary): 261 to 262° C., starting from 1-oxa-2-oxo-3,8-diaza-spiro (4,5) decane and 2-(4'-nitrophenyl)-ethyl bromide.

(c) 1 - oxo - 3,8 - diaza - 8 - [2'-(3'',4''-dichlorophenyl)-2'-hydroxyethyl]-spiro (4,5) decane; melting point of the hydrochloride (capillary): 257 to 260° C., starting from 1-oxa-2-oxo-3,8-diaza-spiro (4,5) decane and 2-(3', 4'-dichlorophenyl)-ethyl bromide.

(d) 1 - oxa - 2 - oxo - 3,8 - diaza-8-[2'-(4''-aminophenyl)-ethyl]-spiro (4,5) decane; melting point of the hydrochloride (capillary): 274° C. (anhydrous methanol), starting from 1 - oxa - 2 - oxo - 3,8-diaza-spiro (4,5) decane and 2-(4'-aminophenyl)-ethyl bromide.

(e) 1 - oxa - 2 - oxo - 3,8-diaza-8-[2'-(2''-pyridyl)-ethyl]-spiro (4,5) decane, melting at 150° C. (ethyl acetate), starting from 1-oxa-2-oxo-3,8-diaza-spiro (4,5) decane and 2-(2'-pyridyl)-ethyl bromide.

(f) 1 - oxa - 2 - oxo - 3,8 - diaza-8-[2'-(4''-pyridyl)-ethyl]-spiro (4,5) decane; melting point of the dihydrochloride (capillary): 206 to 208° C. (95% ethanol), starting from 1-oxa-2-oxo-3,8-diaza-spiro (4,5)decane and 2-(4'-pyridyl)-ethyl bromide.

(g) 1 - oxa - 2 - oxo - 3,8 - diaza-8-[2'-(4''-acetamidophenyl)-ethyl]-spiro (4,5)decane; melting point of the monohydrochloride (capillary): 292° C. (85% methanol) starting from 1 - oxa - 2-oxo-3,8-diaza-spiro (4,5) decane and 2-(4′-acetamidophenyl)-ethyl bromide.

(h) 1 - oxa - 2 - oxo - 3,8 - diaza-8-[2′-(4″-propionamidophenyl]-spiro (4,5) decane; melting point of the monohydrochloride (capillary): 281 to 282° C. (methanol), starting from 2-(4′-propionamidophenyl)-ethyl bromide.

(i) 1 - oxa - 2 - oxo - 3,8 - diaza-8-[2′-(4″-benzamidophenyl)-ethyl]-spiro (4,5) decane; melting point of the hydrochloride (capillary): 290 to 291° C. (anhydrous methanol), starting from 1-oxa-2-oxo-3,8-diaza-spiro (4,5) decane and 2-(4′-benzamidophenyl)-ethyl bromide.

(j) 1-oxa - 2 - oxo - 3,8 - diaza-8-[2′-(4″-p-chlorobenzamidophenyl)-ethyl]-spiro (4,5) decane; melting point of the hydrochloride (capillary): 305° C. (70% methanol), starting from 1-oxa-2-oxo-3,8-diaza-spiro (4,5) decane and 2-(4′-parachlorobenzamidophenyl)-ethyl bromide.

(k) 1-oxa - 2 - oxo - 3,8 - diaza-8-[2′-(2″-nitrophenyl)-ethyl]-spiro (4,5) decane, starting from 1-oxa-2-oxo-3,8-diaza-spiro (4,5) decane and 2-(2′-nitrophenyl)-ethyl bromide.

(l) 1 - oxa - 2 - oxo-3,8-diaza-8-[2′-(2″-aminophenyl)-ethyl]-spiro (4,5) decane, starting from 1-oxa-2-oxo-3,8-diaza-spiro (4,5) decane and 2-(2′-aminophenyl)-ethyl bromide.

(m) 1 - oxa - 2 - oxo - 3,8 - diaza-8-[2′-(2″-acetamidophenyl)-ethyl]-spiro (4,5) decane, starting from 1-oxa-2-oxo-3,8-diaza-spiro (4,5) decane and 2-(2′-acetamidophenyl)-ethyl bromide.

(n) 1 - oxa - 2 - oxo - 3,8 - diaza-8-[2′-(2″-sulfamidophenyl)-ethyl]-spiro (4,5) decane, starting from 1-oxa-2-oxo-3,8-diaza-spiro (4,5) decane and 2-(2′-sulfamidophenyl)-ethyl bromide.

EXAMPLE 3

1-oxa-2-oxo-3,8-diaza-8-(2′,2′-diphenyl-2′-hydroxyethyl)-spiro (4,5) decane

A solution of 31.2 grams of 1-oxa-2-oxo-3,8-diaza-spiro (4,5) decane and 30 grams of 1-chloro-2,2-diphenyl-ethan-2-ol [M.P. 66° C.] in 250 ml. of anhydrous ethanol is heated for 6 hours at reflux. On completion of the reaction the spiro (4,5) decane hydrochloride is filtered off and the solvent evaporated under vacuum. The resulting oily residue is dissolved in 200 ml. of chloroform and the solution is repeatedly washed with water until the halogen ions have disappeared. The chloroform is evaporated and the residual thick oil converted into the hydrochloride in ethanol. The crystals thus formed are filtered off and recrystallized from ethanol of 98% strength, to yield finally 10 grams of the hydrochloride of 1-oxa-2-oxo-3,8-diaza-8-(2′,2′-diphenyl-2′-hydroxyethyl)-spiro (4,5) decane in the form of white crystals melting (capillary) at 250° C. with decomposition.

The following compounds were also prepared by the process of this example:

(a) 1-oxa - 2 - oxo-3,8-diaza-8-(3′-phenyl-3′-methoxypropyl)-spiro (4,5) decane; melting point of the monohydrochloride (capillary) 228° C. (anhydrous ethanol), starting from 1-oxa-2-oxo-3,8-diaza-spiro (4,5) decane and 3-phenyl-3-methoxy-propyl chloride.

(b) 1-oxa - 2 - oxo-3,8-diaza-8-[2′-(4″-chlorophenyl)-2′-phenyl-2′-hydroxyethyl]-spiro (4,5) decane, starting from 1-oxa-2-oxo-3,8-diaza-spiro (4,5) decane and 1-chloro-2-(4′-chlorophenyl)-2-phenylethan-2-ol.

(c) 1-oxa - 2 - oxo-3,8-diaza-8-[2′-(2″-fluorophenyl)-2′-phenyl-2′-hydroxyethyl]-spiro (4,5) decane, starting from 1-oxa-2-oxo-3,8-diaza-spiro (4,5) decane and 1-chloro-2-(2′-fluorophenyl)-2-phenylethan-2-ol.

(d) 1-oxa - 2 - oxo-3,8-diaza-8-[3′-(4″-fluorophenyl)-3′-methoxypropyl]-spiro (4,5) decane, starting from 1-oxa-2-oxo-3,8-diaza-spiro (4,5) decane and 3-(4′-fluorophenyl)-3- methoxypropyl chloride.

(e) 1-oxa - 2 - oxo-3,8-diaza-8-[3′-(2″-chlorophenyl)-3′-methoxypropyl]-spiro (4,5) decane, starting from 1-oxa-2-oxo-3,8-diaza-spiro (4,5) decane and 3-(2′-chlorophenyl)-3-methoxypropyl chloride.

Various modifications and equivalents will be apparent to one skilled in the art and may be made in the compounds, compositions, and methods of the present invention without departing from the spirit of scope thereof.

What we claim is:

1. A compound selected from the group consisting of (A) spiro (4,5) decane compounds of the Formula I in which R is:

$$Ar—X—(CH_2)_n—$$

wherein

X is selected from the group consisting of —CO— and —CH$_2$—;

$n$ is selected from 1, 2 and 3 when X is —CO— and $n$ is 1 when X is —CH$_2$—;

Ar is selected from the groups consisting of:
phenyl and halophenyl when X is —CO—, and
nitrophenyl, aminophenyl, acetamidophenyl, propionamidophenyl, benzamidophenyl, parachlorobenzamidophenyl, sulfamidophenyl and diloweralkylsulfamidophenyl, when X is —CH$_2$—;

and (B) physiologically acceptable addition salts thereof with organic or mineral acids.

2. The compound of claim 1 which is 1-oxa-2-oxo-3,8-diaza - 8 - [2′-(4″-dimethylsulfamidophenyl)-ethyl]-spiro (4,5) decane.

3. The compound of claim 1 which is 1-oxa-2-oxo-3,8-diaza-8-[2′-(4″-sulfamidophenyl)-ethyl]-spiro (4,5) decane.

4. The compound of claim 1 which is 1-oxa-2-oxo-3,8-diaza-8-[2′-(4″-aminophenyl)-ethyl]-spiro (4,5) decane.

5. The compound of claim 1 which is 1-oxa-2-oxo-3,8-diaza-8-[2′-(4″-acetamidophenyl)-ethyl]-spiro (4,5) decane.

6. The compound of claim 1 which is 1-oxa-2-oxo-3,8-diaza-8-[2′-(4″-benzamidophenyl)-ethyl]-spiro (4,5) decane.

7. The compound of claim 1 which is 1-oxa-2-oxo-3,8-diaza - 8 - [2′-(4″-p.chlorobenzamidophenyl)-ethyl]-spiro (4,5) decane.

8. 1 - oxa - 2 - oxo-3,8-diaza-8-[3′-(4″-fluorobenzoyl)-propyl]-spiro (4,5) decane.

9. 1-oxa - 2 - oxo-3,8-diaza-8-[2′-(4″-nitrophenyl)-ethyl]-spiro (4,5) decane.

10. 1 - oxa - 2 - oxo-3,8-diaza-8-[2′-(4″-propionamidophenyl)-ethyl]-spiro (4,5) decane.

11. 1-oxa-2-oxo-3,8-diaza-8-phenacyl-spiro (4,5) decane.

12. 1-oxa - 2 - oxo - 3,8 - diaza-8-(4′-chlorophenacyl)-spiro (4,5) decane.

References Cited

UNITED STATES PATENTS 3,399,192  8/1968  Regnier et al. _____ 260—240

HENRY R. JILES, Primary Examiner

G. T. TODD, Assistant Examiner

U.S. Cl. X.R.

260—294.3; 424—267